United States Patent [19]
Odier

[11] 3,850,267
[45] Nov. 26, 1974

[54] HEAT COLLECTOR AND SUPPORT FOR DISC BRAKES

[75] Inventor: Jean Odier, Antony, France

[73] Assignee: Societe Anonyme Francais du Ferodo, Paris, France

[22] Filed: Feb. 12, 1973

[21] Appl. No.: 331,894

[30] Foreign Application Priority Data
Feb. 16, 1972 France .............................. 72.05122

[52] U.S. Cl................ 188/71.6, 188/73.5, 188/167, 188/264 AA, 192/113 A
[51] Int. Cl............................................ F16d 65/84
[58] Field of Search .......... 188/83, 71.1, 71.6, 73.3, 188/73.5, 264 R, 264 A, 264 AA, 167; 192/113 A, 113 B

[56] References Cited
UNITED STATES PATENTS

| | | | |
|---|---|---|---|
| 2,764,265 | 9/1956 | Runner | 188/264 A |
| 3,053,346 | 9/1962 | Butler | 188/73.3 X |
| 3,391,761 | 7/1968 | Brueder | 188/73.5 |
| 3,473,631 | 10/1969 | Schmid | 188/73.3 |
| 3,625,314 | 12/1971 | Rinker | 188/73.5 |

*Primary Examiner*—George E. A. Halvosa
*Attorney, Agent, or Firm*—Young and Thompson

[57] ABSTRACT

The invention relates to a device such as a brake, clutch or the like having a rotating member liable to become overheated in use, and comprising heat-dissipation means constituted by a heat-collector shoe arranged in a guide-support which permits movement of the heat-collector shoe perpendicularly to the rotating member. The contact between the heat-collector shoe and the rotating member can be improved by providing the contact surface of the heat-collector shoe with shallow grooves arranged in squares, and the collector shoe body may be cooled by a network of internal conduits which are intended to receive a circulation of cooling fluid from the exterior. The heat-collector shoe may be made of aluminium.

11 Claims, 10 Drawing Figures

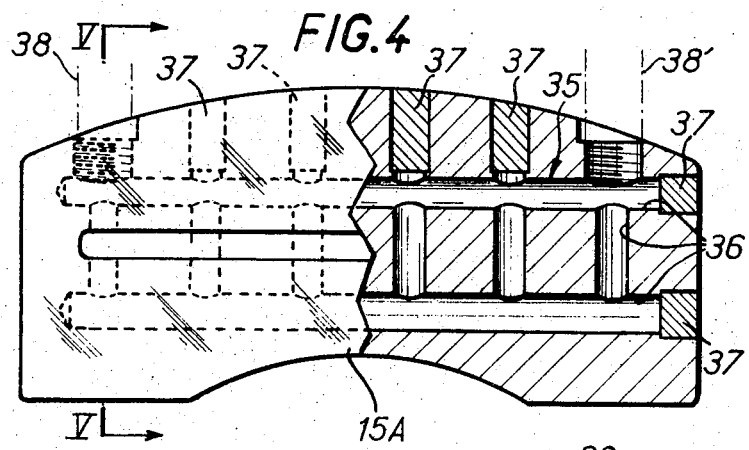
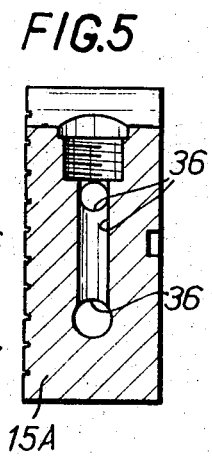
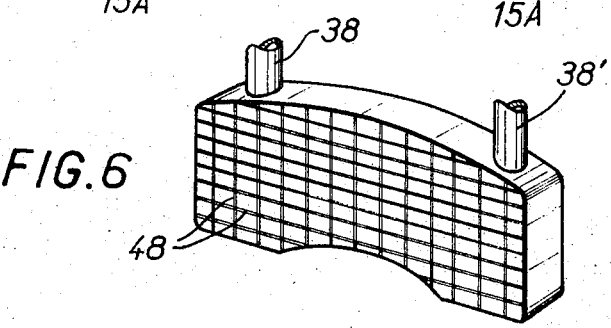
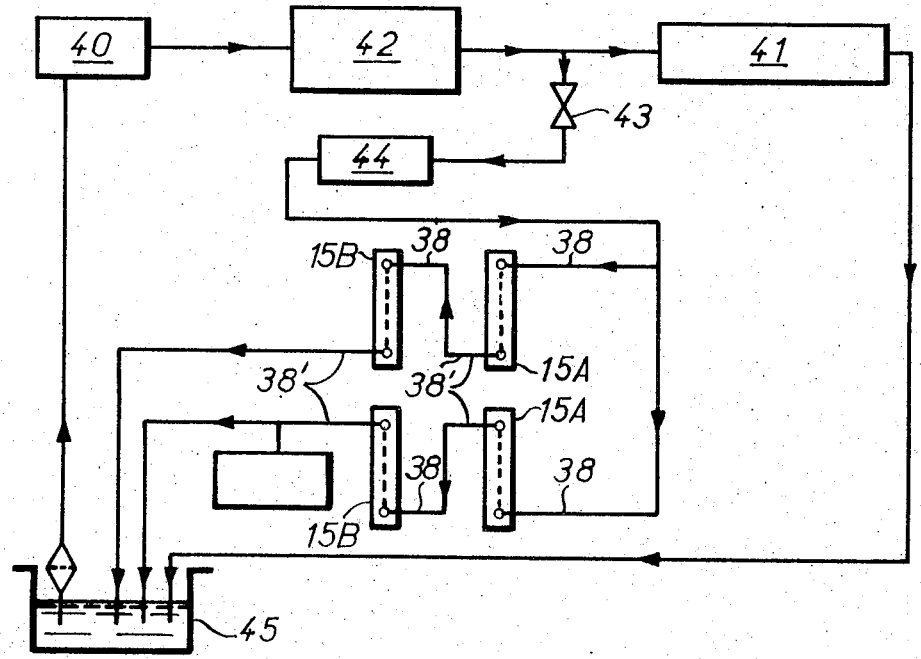

FIG.8
FIG.9
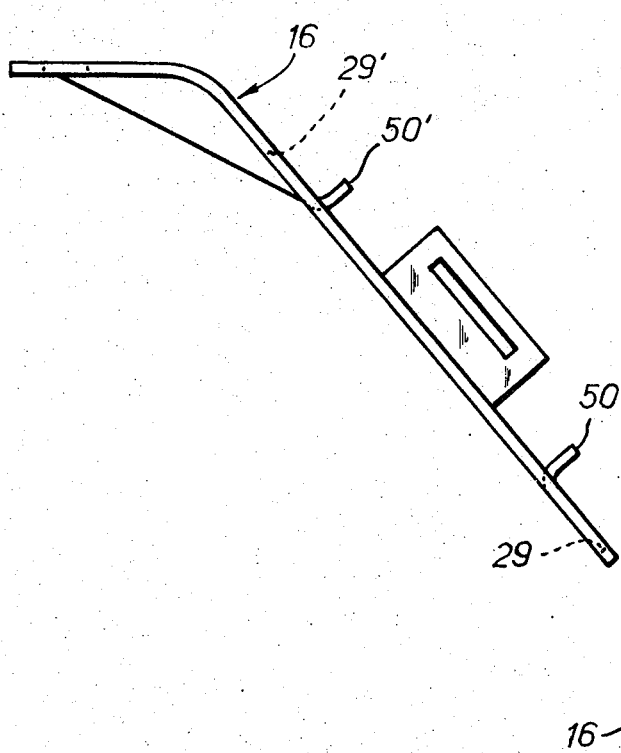
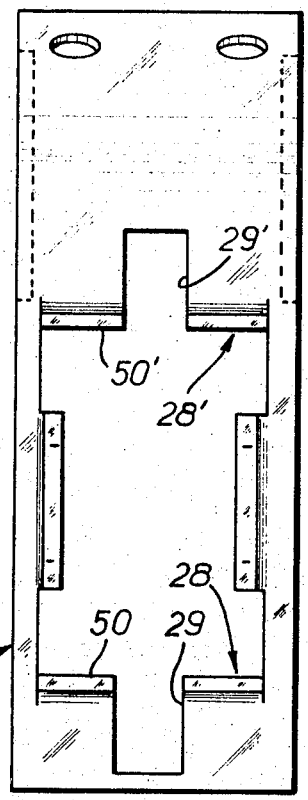
FIG.10
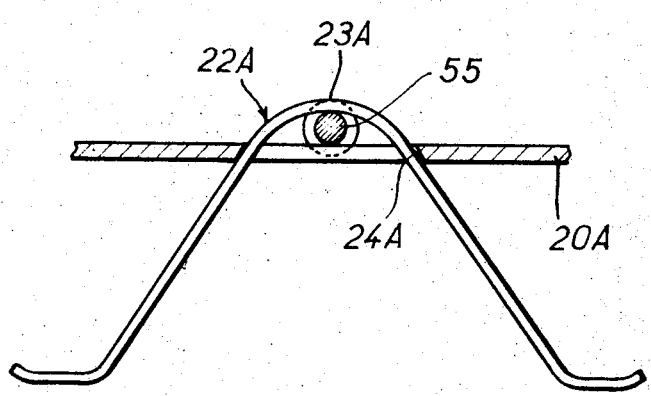

HEAT COLLECTOR AND SUPPORT FOR DISC BRAKES

In the U.S. Patent Application Ser. No. 175,199 of Aug. 26 1971, now U.S. Pat. No. 3,767,015, there has been described a device with a rotatable member such as a brake, slowing-down device, clutch or the like, comprising a rotating member subjected to heating of any kind, and at least one shoe known as the heat-collector shoe, other than a brake shoe, and subjected to operating means by which it is urged in the direction of the said rotating member.

This heat-collector shoe advantageously absorbs at least part of the heat acquired by the rotating member by reason of the said tangential braking force, and the heat thus absorbed by this shoe is evacuated by this latter into the surrounding medium, either directly or through the intermediary of a cooling fluid provided for example inside the shoe.

The present invention has for its object various particular forms of construction of such a heat-collector shoe, of the members associated with this latter, and in particular of its support, of the cooling circuit which it may possibly comprise, and of its installation inside the rotating member device on which it is equipped.

More precisely, the present Application has especially for its object a support which makes it possible to ensure in a simple and effective manner, a continuous contact of the heat-collector shoe against the rotating member to be cooled, irrespective of the possible irregularities or surface deformations of this latter, and without the application of an excessive pressure force on the said shoe, this support thus satisfying in an advantageous manner certain requirements which are a priori contradictory.

The objects, characteristic features and advantages of the invention will be further brought out in the description which follows below, given by way of example, reference being made to the accompanying diagrammatic drawings, in which:

FIG. 4 is a view in elevation with parts broken away, of a heat-collector shoe provided on this device;

FIG. 5 is a view in transverse section of this shoe, taken along the line V—V of FIG. 4;

FIG. 6 is a diagrammatic view in perspective of this shoe;

FIG. 7 is a circulation diagram for the cooling fluid associated with the heat-collector shoes fitted on the device with a rotating member according to the invention;

FIG. 8 is a view in elevation of the single support of the heat-collector shoe according to the invention, following an alternative form of construction of this support;

FIG. 9 is a plan view of this alternative form of construction;

Figure 2:
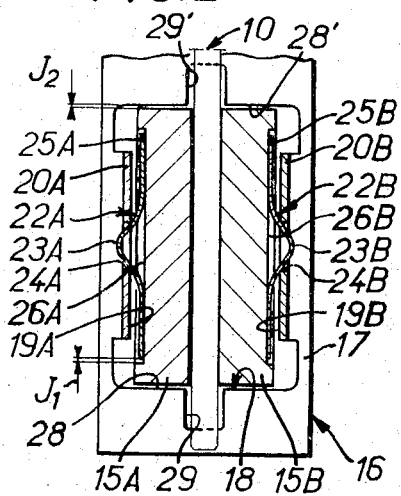
FIGS. 2 and 3 are views in partial cross-section of this device, taken respectively along the line II—II and the line III—III of FIG. 1.
Figure 3:
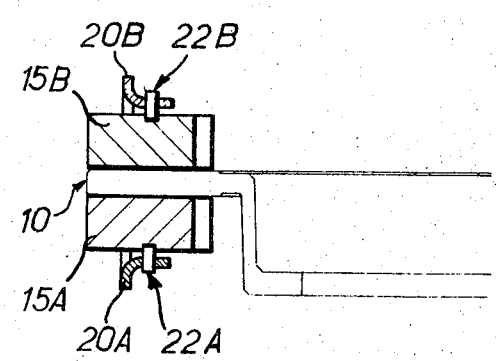

FIG. 10 repeats in part a detail of FIG. 2, and relates to an alternative form of construction.

The above figures illustrate the application of the present invention to the case in which the device with a rotating member is a disc-brake.

Figure 1:
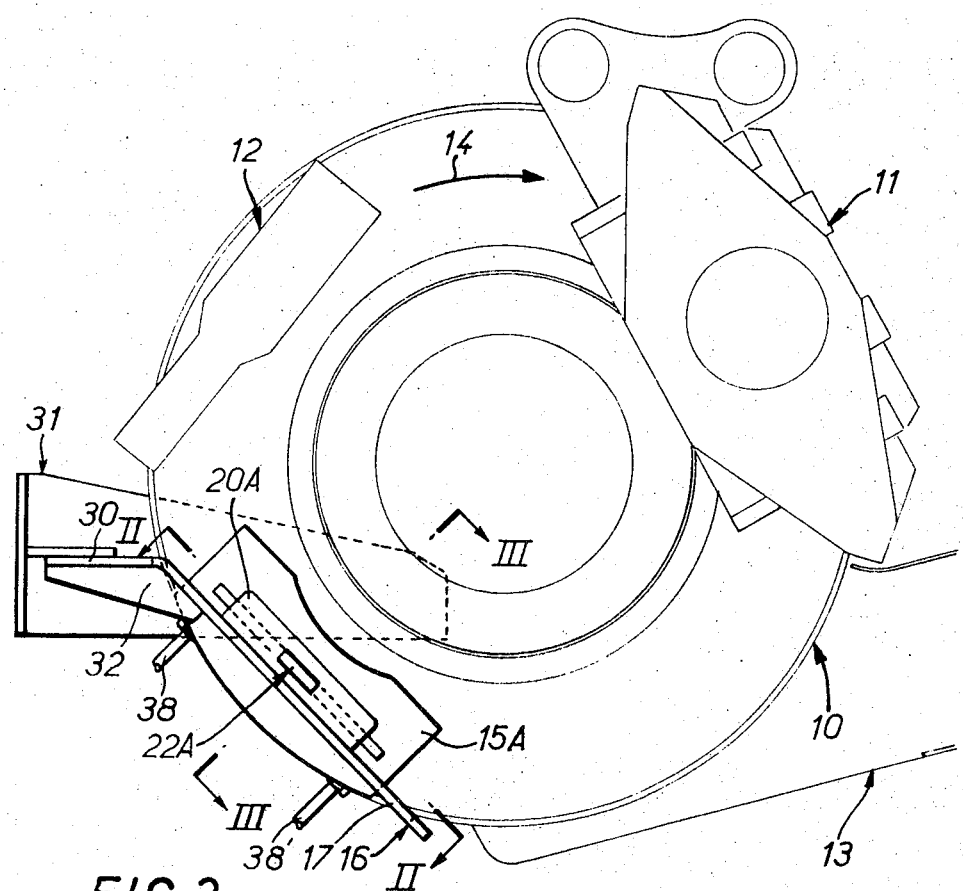
FIG. 1 is a general view in elevation of a device with a rotating member equipped with heat-collector shoes according to the invention.

There has been shown diagrammatically at 10 the disc of a brake of this kind, at 11 the main braking means associated with this disc, at 12 auxiliary braking means, for parking for example, and at 13 an air conduit provided for cooling the disc, this conduit having its opening located immediately downstream of the main braking means 11 in the direction of rotation of the disc 10, this direction having been indicated by an arrow 14 in FIG. 1.

As described in the Patent Application referred to above, a brake of this kind is provided with heat-collector shoes, apart from the brake shoes which are provided on the main and auxiliary braking means 11 and 12.

According to a first aspect of the invention, there are two heat-collector shoes 15A, 15B arranged on each side of the disc 10, immediately downstream of the opening of the cooling air conduit 13, which does not interfere with the cooling of the disc 10. In addition, experience has shown that this cooling air advantageously affects, to a certain extent, the shoes 15A and 15B which it cools, at least partly.

These shoes 15A, 15B are arranged in a guiding support 16 which permits their movement perpendicularly to the plane of the disc 10.

This support 16 comprises a sole-plate 17 provided with a window 18 which is generally rectangular in the example shown, and which on the one hand permits engagement of the support 16 on the disc 10, substantially along a chord of the disc, and on the other hand ensures the reception of the two heat-collector shoes 15A and 15B.

Those of the sides 19A, 19B of the said window 18 which are arranged on each side of the disc 10, parallel to the plane of the disc are each provided, on at least one part of their length, with an edge 20A, 20B respectively.

In practice, these edges 20A and 20B form an integral part of the sole-plate 17 of the support 16 and, in the case such as illustrated, of a stamped metal support, are produced for example by cutting out the sole-plate 17 of this support and folding back the metal freed by this cutting-out.

These edges 20A, 20B serve as a support for the operating means associated with the shoes 15A, 15B for applying them against the disc 10.

In the example shown, and according to another aspect of the invention, these operating means also contribute to the retention of the corresponding shoes.

Each operating means comprises an elastic blade generally of V-shape, 22A, 22B, respectively, having a curved central portion 23A, 23B engaged in an opening 24A, 24B formed for that purpose in the corresponding edge 20A, 20B, and two side wings 25A, 25B in line with each other, the said wings being in elastic contact against the heat-collector shoe 15A, 15B corresponding.

A clearance $J_1$ is preferably left at the end of each wing 25A, 25B of the elastic blades 22A, 22B between such a wing and the corresponding extremity of the groove 26A, 26B in which it is engaged.

Those of the sides 28, 28' of the window 18 in the sole-plate 17 of the support 16 which are arranged transversely with respect to the plane of the disc 10, each comprise a slot in their central zone, 29, 29' respectively, in order to facilitate the passage of the disc 10.

It will be noted that a lateral clearance $J_2$ is provided between each of these sides 29, 29' and the corresponding edges of the heat-collector shoes 15A, 15B.

As will be readily understood, the elastic blades 22A, 22B are maintained radially with respect to the disc 10 by their curved central portions 23A, 23B, and by their wings 25A, 25B they ensure the radial maintenance with respect to the disc of the heat-collector shoes 15A, 15B.

As will also be quite readily understood, the clearances $J_1$ and $J_2$ referred to above, as well as the elastic nature of the operating and maintenance means associated with the heat-collector shoes 15A, 15B, ensure with great flexibility as good an application as possible of these heat-collector shoes against the disc 10, irrespective of the inevitable irregularities of mounting and/or the warping which may exist in the disc 10.

This support 16 conjointly ensures the guiding of these heat-collector shoes perpendicularly to the plane of the disc, under the action of the elastic blades 22A, 22B.

Briefly, and as is confirmed by experience, this elastic control and this guiding with play results in a good contact between the heat-collector shoes 15A, 15B and the disc 10, a normal force applied on this disc by these shoes as small as possible, and the possibility for the said shoes to follow as well as possible the movement due to any possible warping of the disc 10, without substantial alteration of the normal force in question.

The sole-plate 17 of the support 16 is extended by a mounting-plate 30 provided so as to ensure fixing on any fixed element 31 of the brake.

This mounting-plate 30 forms an elbow with the sole-plate 17, FIG. 1, and a reinforcing gusset 32 is added in the zone of this elbow, perpendicularly to the mounting-plate 30 and to the sole-plate 17.

Preferably, and as described in the above-mentioned Patent Application, the heat-collector shoes 15A, 15B each comprise an internal conduit system provided at 35 for the circulation of a cooling fluid.

A heat-collector shoe of this kind is shown separately in FIGS. 4 to 6.

In this case, it is the shoe 15A which is shown, but it is understood that the shoe 15B is similarly constituted.

The internal conduit system 35 of this shoe is formed, in the example shown, by a chequer system of channels 36 produced by drilling and then filling with screwed or welded plugs 37.

Two of these bores are however left free at the extremities of the shoe for coupling to pipes 38, 38' provided for the circulation of a cooling fluid (see FIGS. 1 and 4).

In the case where the disc-brake described is intended for an installation, and for example an automobile vehicle, comprising a central hydraulic system 40 (see FIG. 7) supplying a utilization circuit 41 through the intermediary of a pressure regulator 42, the pipe 38 of the heat-collector shoes 15A associated respectively with the right-hand and left-hand disc-brakes for example of the vehicle, is connected downstream of the pressure regulator 42, with preferably, and as shown, interposition of a flow-regulating device 43 such as a cock or a nozzle and a radiator 44.

A connection of this kind does not interfere with safety precautions, as the pressure of the hydraulic circuit cannot fall abruptly in the event of a leakage, and it permits the assurance of a rate of uniform flow of cooling fluid for the heat-collector shoes, irrespective of the speed of rotation of the motor which drives the pressure station 40, which is usually constituted by a pump.

In the example shown, each heat-collector shoe 15A is in series with a heat-collector shoe 15B before the cooling fluid returns to a tank 45.

It will of course be understood that these shoes could be in parallel in the same direction, or in opposite directions.

The pipes 38, 38' associated with each heat-collector shoe are preferably made of a flexible material such as rubber in order to minimize on the said shoes the reaction effects due to the pressures which exist in these pipes.

If necessary, the flexible material which constitutes these pipes may be reinforced, for example by a metal braid.

As shown in FIG. 6, for the heat-collector shoe 15A, the face of each heat-collector shoe which is intended to come into contact with the disc 10 is provided on its surface, according to another aspect of the invention, with a network, for example in squares as shown, of grooves 48 of small depth.

It has in fact been observed that the contact with the disc 10 of a shoe provided with such a network of grooves is improved, and in particular good results are obtained in this connection with grooves arranged in squares having a pitch of about 5 mm., each groove having a depth of about 1 to 3 mm.

Similarly, good results have generally been obtained by utilizing aluminium A5 as the constituent metal of these heat-collector shoes, in association with a disc of alloyed cast-iron.

At the same time, good results have been obtained with elastic blades 22A, 22B of 5 mm. in width and 0.3 mm. in thickness obtained from a hard spring steel, the shoes subjected to such blades being each capable of applying to the disc a force of the order of 200 grams with a variation of plus or minus one gram, due to warping of the disc.

This force introduces a friction torque on the disc of the order of 0.015 m.daN, whereas the maximum braking torque is of the order of 190 m.daN, and the residual braking torque is generally not less than 0.300 m.daN.

In accordance with the alternative form of construction illustrated in FIGS. 8 and 9, the sides 28, 28' of the window 18 of the support 16 are also each provided, over at least a portion of their length, by an edge 50, 50', interrupted by the notch 29, 29' existing on these sides.

These edges assist the guiding of the heat-collector shoes corresponding, at right angles to the plane of the disc.

In the alternative form shown in FIG. 10, a stud, a screw or the like 55 is engaged between the curved central portion of the elastic blade 22A for example, associated with the heat-collector shoe 15A, and the edge 20A corresponding of the support 16, for the support on each side of the said blade on the corresponding edges of the opening 24A of each edge 20A in which the said central portion 23A is engaged.

This stud or screw 55 assists in the maintenance in position of the elastic blade 22A, and a similar arrangement may be adopted for the elastic blade 22B.

It will of course be understood that the present invention is not limited to the forms of embodiment and application described and shown, but includes any alternative form of construction.

In particular, it would still be within the scope of the invention to make the support 16 by casting and/or by incorporating it in a fixed element of the main braking means and/or the auxiliary braking means.

Finally, the application of the invention is not limited to the sole field of disc brakes, but extends to cover any device comprising a rotating member liable to become heated.

What we claim is:

1. A device such as a brake, slowing down device, clutch or the like, of the kind comprising a rotating disc subjected to heating of any kind, two heat-collector shoes distinct from any braking shoe and disposed on each side of said disc, and a guide-support comprising a sole-plate having a window therein defined by sides for passage of said disc, substantially along a chord of said disc, and for the reception with a lateral clearance of said two heat-collector shoes, the sides of said window which are on each side of said disc having each a flange over at least part of their length, operating means associated with the corresponding heat-collector shoe and supported by said flanges, said operating means comprising a substantially V-shaped elastic blade having a curved central portion engaged in an opening in the corresponding said flange for the retention of said blade, each said blade having two lateral wings elastically supported against the associated heat-collector shoe for urging said shoe toward said disc.

2. A device as claimed in claim 1, in which a said edge forms an integral part of the sole plate of said support and is produced during the cutting out of the window of said support.

3. A device as claimed in claim 1, in which said lateral wings of said elastic blade are engaged in a groove formed for that purpose in said heat-collector shoe, whereby said blade assists in the maintenance in position of said shoe.

4. A device as claimed in claim 3, in which a clearance is left at the end of each wing of said elastic blade, between said blade and the corresponding extremity of the groove in which said blade is engaged.

5. A device as claimed in claim 1, in which a stud, screw and the like is engaged between the curved central portion of said elastic blade and the corresponding edge of the sole-plate of said support, to serve as a support on each side of said blade on the corresponding edges of the opening in which said curved central portion is engaged.

6. A device as claimed in claim 1, in which the sides of said window of the sole-plate of said support which are arranged transversely with respect to the plane of said disc are flanged over at least part of their length with an edge provided for guiding the corresponding heat-collector shoe.

7. A device as claimed in claim 6, in which a said edge forms an integral part of the sole-plate of said support and is produced during the cutting-out of the window of said support.

8. A device as claimed in claim 1, in which the sides of the window of said support which are disposed transversely with respect to the plane of said disc each comprise a slot in their central zone for passage of said disc.

9. A device as claimed in claim 1, in which said heat-collector shoe is provided at its surface with a network of grooves of small depth, arranged for example in squares.

10. A device as claimed in claim 1, in which said heat-collector shoe is made of aluminium.

11. A device as claimed in claim 1, and braking means capable of applying a braking torque to said disc, and an inlet of cooling air to said disc, said heat-collector shoes are disposed immediately downstream of said air inlet, in the direction of rotation of said disc.

* * * * *